July 11, 1961

J. T. LINGLE 2,992,385

SEMICONDUCTOR DEVICES

Filed Jan. 8, 1960

INVENTOR.
JOHN T. LINGLE

BY Omund R. Dahle

ATTORNEY

United States Patent Office 2,992,385
Patented July 11, 1961

2,992,385

SEMICONDUCTOR DEVICES

John T. Lingle, St. Paul, Minn., assignor to Minneapolis-Honeywell Regulator Company, Minneapolis, Minn., a corporation of Delaware Filed Jan. 8, 1960, Ser. No. 1,230
11 Claims. (Cl. 323—22)

Figure 1:
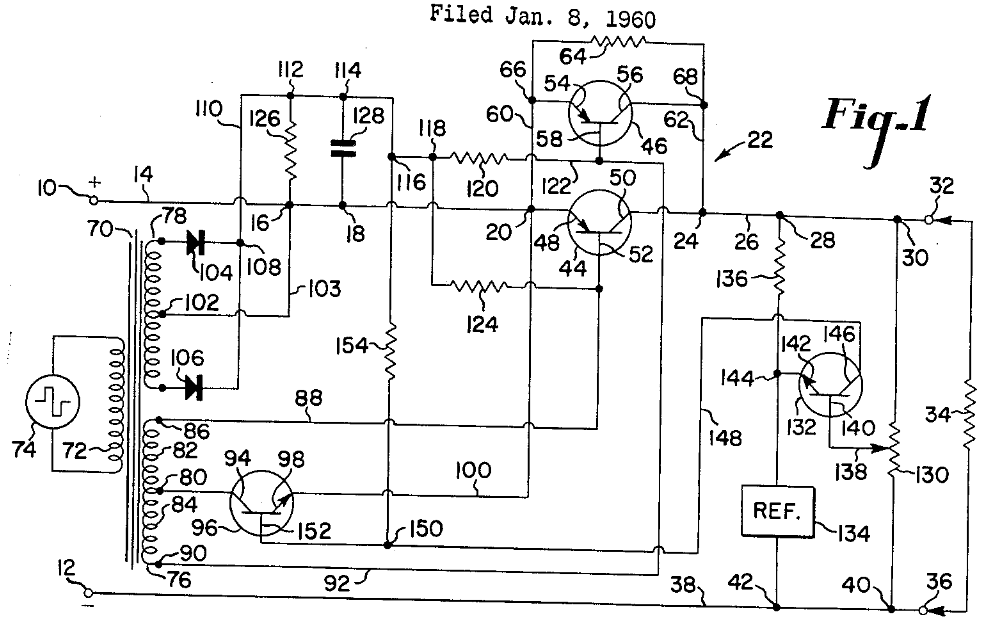

This invention relates generally to voltage regulating apparatus and more specifically to a means for increasing the power handling capabilities of such circuits.

In the conventional series type regulating circuits of the prior art, a controllable impedance element is serially disposed between a source of potential and a load device, the voltage across which is to be maintained constant at a predetermined level. Furthermore, means are generally provided for comparing the actual output voltage from the regulator circuit with a predetermined reference voltage so as to produce an error signal which, when applied to a controllable impedance element, varies the impedance of said element in a direction tending to minimize the deviation of the output voltage from the reference voltage. Since, as mentioned previously, a controllable impedance element is in series with the load, the amount of power deliverable to the load is generally limited by a current rating of the controllable impedance element.

A typical example of a prior art voltage regulating scheme is described in the Chase Patent No. 2,693,568 issued November 2, 1954. In this circuit, the controllable impedance element is a transistor. In the state of the art as it exists today, the power dissipation rating of the best power transistors is generally in the neighborhood of 100 watts. One approach which has been used to increase the power handling capabilities of voltage regulator circuits utilizing transistors has been to place one or more additional transistors, having substantially identical properties, in parallel with the series transistor such that the total load current is divided equally between these parallel transistors. The main disadvantage in following this approach lies in the fact that it is exceedingly difficult to maintain an equal current flow through each transistor. Variations in the current gain parameters between the paralleled transistors caused by temperature changes, for example, may cause one transistor to assume total load current thereby producing a runaway condition unless some additional stabilization circuitry is provided.

The present invention obviates these difficulties by sharing the time during which the total load current flows to the load between two or more transistors. By doing so, the total load current flows through a single transistor at any one time, but the total time that one transistor is conducting is only one-half, one-third, etc. (depending on the number of transistors used) of the total time that the regulator is operating. As a result, each transistor dissipates only a fraction of the total power which would otherwise be dissipated by a single transistor.

It is accordingly an object of the present invention to provide an improved series type voltage regulating circuit.

Another object of this invention is to provide an improved series type voltage regulating circuit utilizing transistors as the controllable impedance element.

Still another object of the present invention is to provide a means for increasing the power handling capabilities of transistor voltage regulating circuits over that which can be obtained with prior art devices of the same type designed for the same purpose.

In accordance with the immediately foregoing object, it is still another object of this invention to provide a means for time sharing the current to be regulated between two or more controllable impedance means.

Still other objects of the invention will become apparent upon a more comprehensive understanding of the invention for which reference is made to the following specification and drawings.

Figure 2:
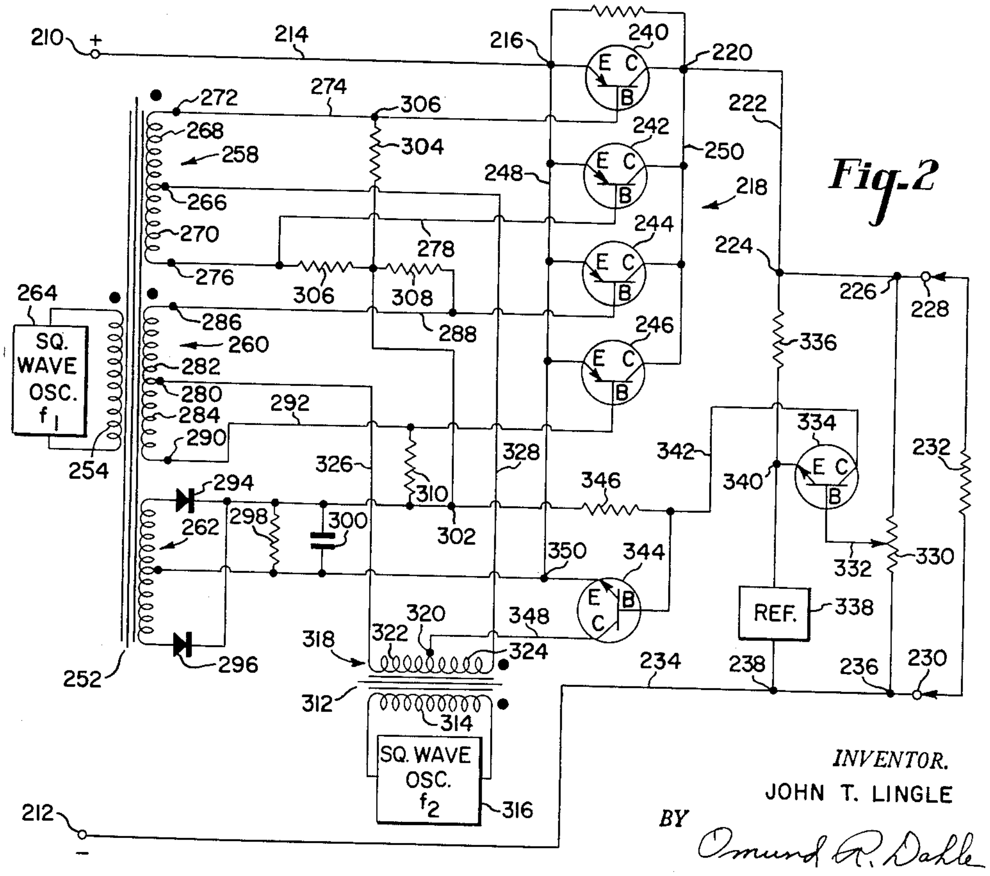

In the drawings:

FIGURE 1 is a circuit schematic of a preferred embodiment of the present invention, and FIGURE 2 illustrates a second embodiment of the invention.

Briefly, the circuit of this invention incorporates in a series type voltage regulating circuit two or more controllable impedance elements connected in parallel with one another and serially disposed between a source of current and a load, the voltage across which is to be maintained constant. In addition, means are provided to periodically and alternately reduce the impedance of said controllable impedance elements such that the load current is time shared between the controllable impedances. A feedback system is utilized in the circuits to control the current flowing through the conducting one of said controllable impedance elements so as to compensate for deviation of the load voltage from a fixed and predetermined reference voltage.

Referring now to FIGURE 1, there is shown a pair of input terminals 10 and 12 which are adapted to be connected to a source of direct current voltage. Although this source is not shown, it may be obtained from the output of a full wave rectifier, from the armature windings of a direct current generator, or from some other suitable source. From the input terminal 10 a circuit may be traced through conductor 14 and the junctions 16 and 18 to the input terminal 20 of a series controllable impedance device indicated generally by the numeral 22. Terminal 24 is the output terminal of a variable impedance device 22. From terminal 24, a circuit path may be traced through conductor 26 and junctions 28 and 30 to the positive output terminal of the load 32. The load 34, the voltage across which is to be maintained constant, is connected between the positive output terminal 32 and the negative output terminal 36. From terminal 36, the circuit path is completed via conductor 38 and junctions 40 and 42 to the negative input terminal 12.

The variable impedance device 22 may be comprised of a plurality of semiconductor current control means, here shown as PNP type transistors 44 and 46. It is not intended that the invention be limited to the use of transistors since it may be possible to employ vacuum tubes as the variable impedance device. Transistor 44 is provided with a first output or emitter electrode 48, a second output or collector electrode 50 and a control or base electrode 52. Likewise, transistor 46 is provided with a first output or emitter electrode 54, a second output or collector electrode 56, and a control or base electrode 58. Transistors 44 and 46 are connected in a parallel relationship with one another. More specifically, emitter electrode 48 of transistor 44 is joined to an emitter electrode 54 of transistor 46 by means of a conductor 60, and the collector electrode 50 of transistor 44 is connected to the collector electrode 56 of transistor 46 by means of a conductor 62. One side of a resistor 64 is joined to conductor 60 at junction 66 while the other end of resistor 64 is connected to conductor 62 at junction 68. Thus resistor 64 is effectively in parallel with the transistors 44 and 46 and permits a predetermined amount of current to flow to the load even when the transistors 44 and 46 are both in a high impedance state.

Means are provided for alternately and sequentially rendering transistors 44 and 46 conductive. When transistor 44 is conductive the current flowing from the source to the load follows a path through conductor 14 and the emitter to collector path of transistor 44 and through the conductor 26 to the load 34. This current is returned to the source through conductor 38. When transistor 46 is conducting, however, and transistor 44 is cut off, current flows from the positive source terminal 10, through conductor 14, through conductor 60, through the emitter to collector path of transistor 46, and through conductors 62 and 26 to the positive output terminal 32. From terminal 32 the current flows through the external load 34 and back to the negative source terminal 12 through conductor 38.

The means used to provide the control signals for alternately and sequentially rendering transistors 44 and 46 conductive in the circuit of FIGURE 1 is a transformer 70. It should be understood that other means may be used and a transformer has been chosen merely as one possible expedient. Since transformer 70 has its primary winding 72 energized by alternating signals from a source 74, the signals applied to winding 72 cause signals to be induced in the secondary windings 76 and 78 of the transformer 70. Winding 76 is provided with an intermediate tap 80 dividing said winding into an upper section 82 and a lower section 84. The outside terminal 86 of winding section 82 is connected by means of a conductor 88 to a base electrode 52 of transistor 44. The lower terminal 90 of section 84 is connected by means of a conductor 92 to the base electrode 58 of transistor 46. The intermediate tap 80 on secondary winding 76 is connected to the collector electrode 94 of a NPN transistor 96. The emitter electrode 98 of this transistor is connected by means of conductor 100 to the input terminal 20 of the variable impedance device 22. The secondary winding 78 of transformer 70 is provided with a center tap 102. A pair of diodes 104 and 106 are connected to the secondary winding 78 in a conventional manner to provide full wave rectification of the signals induced therein. The positive output terminal of the full wave rectifier 108 is connected by means of a conductor 110 and junctions 112, 114, 116 and 118 to one side of a resistor 120. The other side of resistor 120 is tied to the base electrode 58 of transistor 46 by means of a conductor 122. A resistor 124 is connected between the junction 118 and the base electrode 52 of transistor 44. A resistor 126 is connected between the junctions 112 and 16 and it forms the load resistor for the full wave rectifier circuit. A capacitor 128 is included between junctions 114 and 18 to provide filtering. Center tap 102 on transformer winding 78 is connected to junction 16 by conductor 103 to provide a negative return for this full wave rectifier positive bias supply and reference it with respect to the potential of terminal 10.

Connected between the junctions 30 and 40 on conductors 26 and 38 respectively, is a potentiometer 130 which is used in conjunction with a NPN transistor 132 and a potential reference 134 to provide a means for sensing variations in the voltage appearing across the load 34. Reference 134 may take many well known forms, examples of which are a battery, a neon glow tube, or a Zener diode. The reference 134 is connected in series with a resistance 136 between the junction 42 and the junction 28. The wiper arm 138 of potentiometer 130 is connected to the base or control electrode 140 of transistor 132. The emitter electrode 142 is connected to a junction 144 between the resistor 136 and the source of reference potential 134. A collector electrode 146 of transistor 132 is connected through a conductor 148 and a junction 150 to the base electrode 152 on transistor 96. Finally, a resistor 154, which is connected between junctions 116 and 150, connects the positive output terminal of the full wave rectifier to the base electrode 152 of transistor 96.

Now that the circuit layout has been described in detail, the operation of the voltage regulator circuit of this invention will now be considered.

*Operation*

The object of the circuit of this invention is of course to maintain the voltage across the load device 34 constant at a predetermined level. In accordance with this idea, source of unregulated potential is connected across the input terminals 10 and 12 of the regulator. The scheme used to provide regulation is to sense any variation in the output voltage from the desired level and to develop feedback control signals proportional to this deviation which are used to vary the impedance of the variable impedance device 22 in such a manner as to compensate for the aforementioned deviation.

As will be explained more fully hereinbelow, the load current follows a path from the source input terminal 10 through conductor 14 to the input terminal 20 of the variable impedance device 22. From there it follows one of two alternate paths; either through the emitter to collector path of transistor 44 to junction 24 or through a conductor 16 and an emitter to collector path of transistor 46 and the conductor 62 to junction 24. From junction 24 the load current flows through conductor 26, the regulator output terminal 32, the load 34, the regulator's negative output terminal 36, and conductor 38 back to the negative source input terminal 12 to complete the circuit.

The particular path followed by the load current in flowing through the controllable impedance element 22 is determined by the polarity of the signals applied to the base electrodes 52 and 58 at the particular time that the circuit operation is being considered. Alternating current source 74, which may be a source of square wave signals, is used to apply signals of a fixed frequency, for example 1200 cycles per second to the primary winding 72 of transformer 70. Because a transformer is used to provide the control signal coupling, the signal appearing at terminal 86 is 180° out of phase with respect to the signal appearing at terminal 90. If the circuit operation is being considered at the time during which terminal 86 is positive, a negative signal will appear at terminal 90. This negative signal is applied by means of conductor 92 to a base electrode 58 of transistor 46. Base electrode 58 is normally held at a positive potential by means of the bias provided by the full wave rectifier arrangement consisting of the transformer secondary winding 78 and its associated diodes 104 and 106. Since transistor 46 is of the PNP type a negative signal at its base electrode with respect to its emitter electrode renders it conductive so that the load current flows from terminal 20 through conductor 60 and the emitter to collector path of transistor 46 and conductors 62 and 26 to the load 34. The positive bias applied to the base electrode 52 of transistor 44 through resistor 124 and also from terminal 86 through conductor 88 insures that it is cut off during the interval in which transistor 46 is conducting. After the completion of one-half of a cycle, however, terminal 86 becomes negative with respect to terminal 90 on the secondary winding 76. The positive potential developed at terminal 90 when combined with the potential developed across the full wave rectifier output load resistor 126 and applied to base electrode 58 through resistor 120 is effective to render transistor 46 nonconductive. Terminal 86, however, is sufficiently negative to overcome the positive bias provided by the full wave rectifier arrangement and, when applied to the base electrode 52 of transistor 44, causes this transistor to conduct. The load current now flows through the conductor 14, the emitter to collector path of transistor 44, and conductor 26 to the load 34.

Because of the manner in which the series transistors 44 and 46 are periodically and sequentially rendered conductive at a frequency determined by the frequency of source 74, the load current flows through a given transistor only a fraction of the time that it would if only a single series transistor is used. As a result, the heat which is developed in one of the transistors when it is conducting is allowed to partially dissipate during the time interval that the other of said transistors is conducting. It is obvious then that it is possible to control a substantially larger amount of power by utilizing this technique than is possible with prior art series type voltage regulator circuits.

In order to maintain a constant voltage across the regulator output terminals 32 and 36, a voltage sensing network and a feedback circuit are included to control the magnitude of current flowing through transistors 44 and 46. As mentioned previously, the voltage sensing network is comprised of a potentiometer 130 connected directly across the regulator output terminals, a NPN transistor 132, and a potential reference 134. The effect of the potential reference is to maintain the emitter electrode 142 of transistor 132 at a fixed potential. Since ransistor 132 is preferably operating in a class A mode, any variation of the voltage appearing at the base electrode 140 is effective to vary the conductivity of transistor 132. A variation in the conductivity of transistor 132 effects the bias applied to transistor 96 through the resistor 154 which is connected between the full wave rectifier output terminal 116 and the junction 150. The variation of the bias on the transistor 96 controls the magnitude of the base drive current applied to the particular series transistor 44 or 46 which happens to be conducting.

An example may be helpful in describing more clearly the operation of the circuit of FIGURE 1. Assume transistor 44 is conducting at the particular time when the circuit is being analyzed, and assume further that a change is made in the load so as to cause the potential developed across it to decrease. The potential at potentiometer wiper arm 138 will therefore decrease proportionately. Since the base electrode 140 of transistor 132 is connected to wiper arm 138, this decrease in potential results in a reduction in the conductivity of NPN transistor 132. As a result, less current tends to flow from the junction 116, through the resistor 154, conductor 148, transistor 132 and through the potential reference 134 to junction 42. Since less current is flowing through resistor 154 via this path, this effects the division of current at junction 150 causing its potential to rise. As junction 150 becomes more possitive, more current flows into the base 152 thereby increasing the conduction of the NPN transistor 96. With the impedance of transistor 96 reduced, there is an increase in the current flowing from the emitter to the base of transistor 44 and through conductor 88, the secondary winding half 82, the collector 94 to the emitter 98 of transistor 96, and the conductor 100. Since transistor 44 is receiving more base drive current, more current is able to flow from the source input terminal 10 through the emitter to collector path of transistor 44 to the load. This increase in the current flowing to the load has the effect of compensating for the initially assumed decrease in load potential.

If a condition should arise tending to cause the load voltage to increase over the preset value, an effect opposite from that described above results. More specifically, transistor 132 tends to conduct more heavily such that the current flowing from the output terminal 114 of the conventional full wave rectifier through resistor 154 tends to increase. The increase in current flow through resistor 154 causes the votage at junction 150 to drop which in turn tends to cause less base drive current to flow to the series regulating transistors 42 or 44 through the NPN transistor 96. As a result, the load current decreases causing the output potential to drop, thereby compensating for the initially assumed increase.

Although the preferred embodiment of FIGURE 1 illustrates only two series controllable impedance means connected in parallel relationship, it is obvious that the technique of this invention can be expanded further in order to supply a heavier load current, should the particular application demand it, by including additional transistors in parallel and by providing a suitable phase shifting network for sequentially rendering said transistors conductive. Also, the resistor 64 which is placed in parallel with series controllable impedance means provides a path for a portion of the load current at all times such that the conducting series impedance means need not carry or control total load current.

In addition to the use of phase shifting techniques for successively and sequentially rendering a particular one of a plurality of series transistors conductive, other means are available for performing the same function and limitation to a phase shifting network is not intended.

*Figure 2 circuit*

The basic circuit arrangement of the circuit of FIGURE 2 is quite similar to that of FIGURE 1. In order to provide regulation of heavier load currents, however, the circuit of FIGURE 2 is provided with two additional series PNP transistors. Means which will be described more fully hereinbelow are provided to alternately and sequentially render one of the transistors in the series controllable impedance device conductive while maintaining the other transistors in a high impedance state.

The source of voltage to be regulated (not shown) is connected directly across the regulator input terminals 210 and 212. A circuit path for the flow of current to the load may therefore be traced through conductor 214, to the input terminal 216 of the series controllable impedance device indicated generally by the numeral 218. After passing therethrough, the current flows through the output terminal 220 of said device and through conductor 222 and junctions 224 and 226 to the positive output terminal of the regulator 228. Connected directly between the positive output terminal of the regulator 228 and the negative output terminal 230 is the load or utilization device 232, here shown as a resistor. From the negative output terminal of the regulator 230 current follows conductor 234 through junctions 236 and 238 to the negative regulator input terminal 212 thereby completing the circuit.

Between the input terminal 216 and the output terminal 220 of the series controllable impedance device are connected a plurality of PNP type transistors 240, 242, 244, and 246. Transistor 240 has an emitter electrode E, a collector electrode C and a base electrode B as do the remaining transistors 242, 244, and 246. The emitter electrodes on these transistors are connected in common by means of a conductor 248 which is connected to conductor 214 at the input terminal 216 of device 218. The collector electrode S on these transistors are also connected in common by means of a conductor 250 to the conductor 222 at the output terminal 220 of device 218. It can be seen then that transistors 240, 242, 244, and 246 are effectively connected in a parallel relationship with one another and serially disposed between the source and the load.

In order to provide sequential switching of these four transistors, a transformer 252 having a primary winding 254, and a plurality of secondary windings 258, 260, and 262 is provided. Primary winding 254 is energized by a source 264 of recurrent square wave signals having a frequency $f_1$. Secondary winding 258 has the center tap terminal 266 dividing said winding into two sections 268 and 270. The upper terminal 272 of winding half 268 is connected to the base electrode 240B of transistor 240 by means of a conductor 274. The outer terminal 276 of winding half 270 is connected to a base electrode 242B of transistor 242 by means of conductor 278. In a similar manner, a center tap terminal 280 on secondary winding 260 divides this winding into two sections 282 and 284 respectively. The outer terminal 286 of winding half 282 is connected to the base electrode 244B by means of conductor 288. Similarly, the outer terminal 290 of winding half 284 is connected to the base electrode 246B through conductor 292.

The diodes 294 and 296 are connected in a conventional manner to the center tapped secondary winding 262 to provide full wave rectification of the signals induced therein. A resistor 298 forms the load for said rectifier circuit while capacitor 300 provides filtering to smooth out ripple voltages which may be present at the positive output terminal 302. The positive output terminal is connected through a resistor 304 to the conductor 274 at junction 306. Similarly, positive output terminal 302 is connected to the conductors 278, 288, and 292 through resistors 306, 308, and 310, respectively.

An additional transformer 312 is also included in the circuit of FIGURE 2. Transformer 312 has its primary winding 314 connected to a source 316 of square wave signals having a frequency $f_2$. The secondary winding 318 of transformer 312 is provided with a center tap 320 which divides said winding into two halves 322 and 324. The outer terminal of winding half 322 is connected directly to the center tap terminal 280 of secondary winding 260 by means of conductor 326. The outer terminal of winding half 324 is likewise connected through a conductor 328 to the center tap terminal 266 of secondary winding 258.

A potentiometer 330, which is connected between junction 226 and 236, i.e. directly across the output of the regulator, is the means used to develop signals proportional to the variations in the regulator output voltage. Potentiometer 330 has a wiper arm 332 connected directly to the base electrode B of NPN type transistor 334. Connected in parallel with potentiometer 330 is the series arrangement of a resistor 336 and a potential reference 338. This series arrangement is connected directly between junctions 224 and 238. The emitter electrode 334E is connected to the common junction 340 between resistor 336 and the source of reference potential 338. Transistor 334 is made to operate in class A mode, and since its emitter electrode is held at a constant reference potential by means of the device 338, any variation of the voltage applied to its base electrode causes a change in the conductivity between the emitter electrode and collector electrode of this transistor. This particular configuration of potentiometer 330, transistor 334 and reference source 338 can therefore be used to develop feedback signals proportional to changes in the regulator output voltages.

The feedback signals so derived are applied by means of conductor 342 which is connected to the collector electrode 334C to the base electrode B of NPN type transistor 344. A resistor 346 also connects base electrode 344B to the positive output terminal 302 of the full wave rectifier. The collector electrode of transistor 344 is connected by means of conductor 348 to the center tap terminal 320 of the secondary winding 318 of transformer 312. The emitter electrode 344E of transistor 344 is connected to the negative output terminal 350 of the full wave rectifier. Similarly conductor 248 connects the emitter electrodes of transistors 240, 242, 244, and 246 to the rectifier negative output terminal 350. Now that the circuit connections have been described in detail, consideration will be given to the operation of the circuit of FIGURE 2.

*Operation*

If the frequency $f_1$ of source 264 is set at twice the frequency $f_2$ of source 316, transistor 240, 242, 244, and 246 will be rendered conductive in sequence. This may be explained as follows. Assume the circuit operation is considered at the time that the square wave signals from source 264 and source 316 are both just starting a positive excursion. Under this assumption a positive signal is applied to control electrodes 240B and 244B, the polarity markings being identified by the dot convention. These positive signals, when added to the normally existing positive bias as applied through resistors 304 and 308 from the output of the full wave rectifier, insure that transistors 240 and 244 are back-biased and are therefore nonconducting. Because of the manner in which the secondary winding half 270 of transformer 252 and secondary winding half 324 of transformer 312 are connected, the positive signal developed in winding half 324 adds to the negative signal developed across winding half 270 so as to cause a cancellation of these two voltages. The voltage applied to the base electrode 242B is therefore approximately equal to the normally existing positive direct current voltage as applied through resistor 306 from the output of the full wave rectifier. Transistor 242 is therefore also back-biased to cut off. The negative signal developed across secondary winding half 322, however, adds the negative signal developed across winding half 284, and hence a signal sufficiently negative to overcome the normally existing positive bias applied through resistor 310 from the full wave rectifier is applied to the base electrode 246B. Since transistor 246 is of the PNP type, this negative signal renders this transistor conductive. A current path is therefore established from the regulator input terminal 210 through conductor 214, to junction 216. The current then follows a path through conductor 248, through the emitter to collector path of transistor 246, and through conductor 250 to the output terminal 220 of the series controllable impedance device 218. From output terminal 220 the current flows through the load 232 and back to the negative source terminal 212 via conductor 234.

Transistor 246 remains conductive until source 264 completes one-half cycle. At this later time, the voltage developed across the secondary windings of transformer 252 reverse in polarity and a negative potential is applied through winding halves 268 and 282 to the base electrode 240B and 244B of transistors 240 and 244, respectively. The signals applied to the base electrodes 242B and 246B through winding halves 270 and 284 at this time are positive. Since the frequency of source 264 is twice that of source 316, the polarity of the signals developed across winding halves 322 and 324 of transformer 312 remain unchanged from their initial polarity. The positive voltage developed across winding half 324 therefore tends to be cancelled by the corresponding negative voltage developed across winding half 268 such that the potential applied to the base electrode 240B is that from the positive terminal of the full wave rectifier and the positive collector to emitter drop of transistor 344. Transistor 240 therefore remains cut off.

The negative voltage developed across winding half 322, however, supplements the negative voltage developed across winding half 282 such that a substantial negative potential, sufficient to overcome the bias applied through resistor 308 from the full wave rectifier's positive output terminal, is applied to the base electrode 244B rendering transistor 244 conductive. The positive bias voltage applied to the base electrode of transistors 240, 242, and 246 through resistors 304, 306, and 310 at this time, coupled with the positive collector to emitter voltage drop across NPN transistor 344 insures that these transistors remain cut off.

By following this type of analysis one step further it can be seen that during the next half cycle of the signal produced by source 264, a positive potential will again be applied to the base electrodes of transistor 240 and 244, thereby driving transistor 244 from a conductive to a non-conductive state. The polarity of the voltages developed across winding halves 322 and 324 are reversed at this time and a positive potential now appears at center tap terminal 280 and a negative potential appears at center tap terminal 266. The positive voltage developed across winding half 322 therefore tends to cancel the negative voltage developed across winding half 284 so that a net potential of substantially zero volts is applied through these transformers to the control electrode 246B of transistor 246. The negative signal developed across winding half 324, however, adds to the negative signal developed across winding half 270 such that transistor 242 is now rendered conductive.

During the time interval between the end of the third half cycle and the beginning of the fourth half cycle of the signal produced by source 264, a positive potential is applied to the control electrode 242B of transistor 242 and to 246B of transistor 246. Transistor 242 is therefore driven from its conducting to its nonconducting state. The positive voltage developed across winding half 322, when added to the voltage developed across winding half 282, causes a cancellation, such that a potential of approximately zero volts is applied to the base electrode 244B through the two transformers. The negative voltage developed across winding half 324, however, adds to the negative voltage developed across winding half 268 such that a substantial negative potential, sufficient to overcome the positive bias produced by the full wave rectifier, is applied to the control electrode 240B thereby rendering transistor 240 conductive. Transistors 242, 244, and 246 at this time are biased into nonconduction by the application of the positive voltage from the full wave rectifier to their respective base electrodes.

This completes one full switching cycle and upon the next excursion of the signals from sources 264 and 316 transistor 246 is again rendered conductive. If, for example, the frequency $f_1$ of source 264 is one thousand cycles per second wherein the frequency $f_2$ of source 316 is 500 cycles per second each transistor will conduct for 0.5 milliseconds every two milliseconds.

It should be understood that all the while that the load current is being switched between the transistors 240, 242, 244, and 246 that regulation of the amount of current flowing is taking place. As in the circuit of FIGURE 1, regulation is achieved by controlling the impedance in the base drive circuit of the conducting one of the parallel connected PNP transistors.

As an example, assume that transistor 240 is conducting at the particular time when the circuit is being analyzed and further assume some change is made in the load 232 tending to cause the output voltage from the regulator to decrease. Since the emitter electrode 334E is held at a fixed voltage by means of potential reference 338, this decrease in voltage, when applied to the base electrode 334B through potentiometer 330, tends to increase the impedance seen between the emitter and collector electrodes of transistor 334. Less current therefore flows from the full wave rectifier output terminal 302 through resistor 346, through conductor 342, and through transistor 334 to junction 340. The decrease in current flowing through resistor 346 causes a more positive potential to be applied to the base electrode 344B of NPN transistor 344. Transistor 344, which like transistor 334 is normally operating class A, therefore presents a lower impedance to the flow of current in the base drive path of transistor 240. This last mentioned path may be traced from center tap terminal 320 on transformer 312, through conductor 348, through the collector to emitter path of transistor 344, through conductor 248, through the emitter to base junction of transistor 240, through conductor 274, through winding half 268, and through conductor 328 back to the outer terminal of winding half 324. An increase in current flowing in this path is effective to cause a reduction in the voltage drop across the emitter to collector electrodes of transistor 240 thereby increasing potential at the regulator output 228. This increase tends to compensate for the initially assumed decrease in output potential.

Another scheme which conveniently may be used to provide successive and sequential switching of the series controllable impedance elements is to utilize a ring type counting circuit, many forms of which are relatively well known in the art. An output signal may be derived from each stage of the counting rate and applied to successive ones of the control electrode on said series controllable impedance elements. As the count advances at a predetermined rate successive ones of said impedance elements will be rendered conductive.

While I have shown and described my invention as applied to a particular system of connections and as embodying various devices diagrammatically shown, it will be obvious to those skilled in the art that changes in modifications may be made without departing from my invention, and I, therefore, aim in the appended claims to cover all such changes in modifications as fall within the true spirit and scope of my invention.

What I claim is new and desire to secure by Letters Patent of the United States is:

1. In a regulating circuit: at least two controllable impedance means each having a maximum permissible power dissipation rating, said controllable impedance means being connected in parallel with one another and serially disposed between source means and load means; means to periodically and alternately reduce the impedance of said controllable impedance means from a high value; and means responsive to variations in load voltage to control the current flowing through the controllable impedance means having a reduced impedance, the arrangement being such that each controllable impedance means conducts current from said source to said load for only a fraction of the total operating time thereby compensating for load voltage variations without exceeding said maximum permissible power dissipation rating of said controllable impedance means.

2. In a regulating circuit: at least two semiconductor current control means having a maximum permissible power dissipation rating, said semiconductor means being connected in parallel with one another and serially disposed between source means and load means; means to periodically and alternately render said semiconductor means conductive in turn; means for deriving signals indicative of variations in load voltage from a predetermined reference level; and feedback means connected to said semiconductor means responsive to said signals for controlling the amount of current flowing from said source to said load.

3. An improved series type regulating circuit for increasing the power handling capabilities of such circuits by sharing the time that current flows through the regulator between two or more series regulating means comprising: a voltage source having a first and second terminal; load means, the voltage across which is to be maintained at a constant predetermined level; a plurality of current controlling means each including first and second output electrodes and a control electrode; means connecting said first output electrodes in common with said first source terminal and means connecting said second output electrodes in common with a first input terminal of said load; means connecting the second terminal of said source to a second input terminal of said load; means for periodically and sequentially applying potentials to said control electrodes such that each of said current controlling means is rendered conductive in turn while the remaining ones of said current controlling means are maintained nonconductive; and signal producing means responsive to changes in load voltage connected to impress upon said control electrodes signals which vary in response to changes in load voltage for controlling the amount of current flowing through said output electrodes of said conductive current controlling means to compensate for said changes in load voltage.

4. An improved regulating ciricuit comprising: a source of direct current voltage having first and second output terminals; load means having first and second input terminals, the voltage across which is to be maintained constant at a predetermined level; at least two semiconductor means each having a plurality of electrodes including a first and second output electrode and a control electrode; means connecting said first output electrodes of said semi-conductor means in common with said first output terminal of said source and means connecting said second output electrodes of said semiconductor means in common with said first input terminal of said load; means connecting said second output terminal of said source to said second input terminal of said load; a source of alternating voltage; means connected to apply said alternating voltage to said respective control electrodes in a phase relationship such that said semiconductor means are periodically and sequentially rendered conductive; means for deriving siginals indicative of variations in load voltage from said predetermined level; and feedback means connected to said control electrodes responsive to said signals for controlling the amount of current flowing from said source to said load.

5. An improved regulating circuit comprising: a source of direct current voltage having first and second output terminals; load means having first and second input terminals, the voltage across which is to be regulated; at least two semiconductor means each having a plurality of electrodes including a first and second output electrode and a control electrode; means connecting said first output electrodes of said semiconductor means in common with said first output terminal of said source and means connecting said second output electrodes of said semiconductor means in common with said first input terminal of said load; means connecting said second output terminal of said source to said second input terminal of said load; biasing means connected to said control electrodes tending to maintain said semiconductor means nonconducting; a source of alternating voltage; means to apply said alternating voltage to said control electrodes in a phase relationship tending to periodically and sequentially overcome the effect of said biasing means on said control electrodes and render said semiconductor means conductive in turn; means for deriving signals indicative of variations in load voltage from said predetermined level; and feedback means connected to said control electrodes responsive to said signals for controlling the amount of current flowing from said source to said load.

6. An improved series type of regulating circuit for increasing the power handling capabilities of such circuits by sharing the time that current flows through the regulator between two or more semiconductor controllable impedance means comprising: a first pair of terminals adapted to be connected to a source of direct current voltage; a second pair of terminals adapted to be connected to load means, the voltage across which is to be maintained constant at a predetermined level; a plurality of semiconductor controllable impedance means each having a pair of output electrodes and a control electrode; means connecting a first of said first pair of terminals in common with a first of said pair of output electrodes of said plurality of semiconductor means; means connecting a second of said pair of output electrodes on said plurality of semiconductor means in common with a first of said second pair of terminals; means connecting a second of said first pair of terminals to the second of said second pair of terminals; biasing means, the output of which is connected between the first of said pair of output electrodes and said control electrodes of said plurality of semiconductor means for normally maintaining said semiconductor means in a high impedance state in the absence of signals overcoming said bias; a source of alternating potential connected to apply said potential to said control electrodes in a phase relationship such that said normal bias applied to said control electrodes on said plurality of semiconductor means is periodically and sequentially overcome thereby permitting current to flow from said first source terminal to said first load terminal through alternative paths; means connected across said second pair of terminals for deriving signals proportional to variations in voltage across the load from a predetermined reference voltage; and means including semiconductor means connected to said signal deriving means and in circuit with said control and first output electrodes of said plurality of semiconductor controllable impedance means to control the amount of current flowing from said source terminals to said load terminals.

7. Apparatus for regulating the current delivered from a direct current source to a load comprising: first and second semiconductor means each having first and second output electrodes and a control electrode; means connecting a first of said output electrodes on said first and second semiconductor means in common to a first terminal of a source of direct current; means connecting the second of said output electrodes on said first and second semiconductor means in common with a first terminal of load means; means connecting a second terminal of said source to a second terminal of said load means; alternating current source means connected to said control electrodes of said first and second semiconductor means effective to render said first and second semiconductor means conductive in sequence on alternate half cycles of said alternating source; and means for controlling the current flowing from said direct current source to said load means through the conducting one of said first or second semiconductor means including further semiconductor means, means connected in parallel with said load means for developing signals proportional to variations in the voltage across said load means from a predetermined value, means for applying said signals to a control electrode on said further semiconductor means to control the conductivity thereof for controlling the drive current available to the conductive one of said first and second semiconductor means.

8. An improved series type transistorized voltage regulating circuit for increasing the power handling capabilities of such circuits by sharing the time that the current being regulated flows through the series regulating means between a plurality of series regulating means comprising; a source of direct current voltage having first and second output terminals; first and second transistors each having an emitter electrode, a collector electrode and a base electrode; a two terminal load device, the voltage across which is to be maintained constant at a predetermined level; means connecting one of the emitter and collector electrodes on said first transistor to said first source terminal and means connecting the other of said emitter and collector electrodes on said first transistor to a first terminal of said load device; means connecting the emitter electrode of said second transistor to the emitter electrode of said first transistor and means connecting the collector electrode of said second transistor connected to said collector electrode of said first transistor; means connecting the second terminal of said source to a second terminal of said load; transformer means, the primary winding of which is energized by an alternating polarity signal source and the secondary winding of which has at least a first and second terminal and a third terminal located intermediate said first and second terminals; means connecting said first terminal of said secondary winding to said base electrode of said first transistor; means connecting said second terminal of said secondary winding to the base electrode of said second transistor such that said first transistor is rendered conductive while said second transistor is rendered nonconductive and vice versa on alternate half cycles of said alternating source; a third and fourth transistor each having an emitter electrode, a collector electrode, and a base electrode; means connecting said collector electrode of said third transistor to the base electrode of a fourth transistor; means connecting said emitter electrode of said third transistor to voltage reference means; potentiometer means having a first and second terminal and an adjustable tap; means connecting said first terminal of said potentiometer to said first terminal of said load; means connecting said second terminal of said potentiometer to said second terminal of said load means such that variations between the voltage across the load and said reference voltage appears as an error signal on said adjustable tap;

means to apply said error signal to said base electrode of said third transistor thereby controlling its conductivity; means connecting the collector electrode of said fourth transistor to said third terminal of said transformer means; and means connecting the emitter electrode of said fourth transistor to said emitter elecrodes of said first and second transistors to control the base drive current of the conductive one of said first and second transistors in response to said error signals to compensate for said variations.

9. An improved regulator circuit comprising: a first pair of terminals adapted to be connected to source means; a second pair of terminals adapted to be connected to load means, the voltage across which is to be maintained constant at a predetermined level; a plurality of semiconductor means each having a plurality of electrodes including first and second output electrodes, and a control electrode; means connecting said first output electrodes of said semiconductor means in common with a first of said first pair of terminals; means connecting said second output electrodes of said semiconductor means in common with a first of said second pair of terminals; means connecting the second of said pair of first terminals to the second of said second pair of terminals; a first source of alternating type signals; a second source of alternating type signals; transformer means connecting said first signal source to said second signal source for algebraically summing said signals; means for applying said summed signals to said control electrodes such that said semiconductor means are successively and sequentially rendered conductive in turn; means connected across said second pair of terminals for deriving an error signal indicative of variations in load voltage from said predetermined level; and feedback means responsive to said error signal connected in a controlling relationship with said plurality of semiconductor means for controlling the amount of current flowing from said source to said load through said semiconductor means.

10. An improved regulating circuit comprising: a source of direct current voltage having first and second output terminals; load means having first and second input terminals, the voltage across which is to be maintained constant at a predetermined level; a plurality of semiconductor means each having a first and second output electrode, and a control electrode; means connecting said first output electrodes of said semiconductor means in common with said first source output terminal and means connecting said second output electrodes of said semiconductor means in common with said first input terminal of said load, means connecting said second output terminal of said source to said second input terminal of said load; a first source of alternating type signals; a second source of alternating type signals having a different frequency than said first source; means connecting said first source to said second source for algebraically summing said signals; means for applying said summed signals to said control electrodes such that said semiconductor means are successively and sequentially rendered conductive in turn; means for deriving an error signal indicative of variations in load voltage from said predetermined level; and feedback means connected to said control electrodes responsive to said error signal for controlling the amount of current flowing from said source to said load.

11. Apparatus for regulating the current delivered from a direct current source to a load comprising at least four semiconductor means each having first and second output electrodes and a control electrode; means connecting said first output electrodes in common with a first terminal of a source of direct current; means connecting said second output electrodes in common with a first terminal of load means, the voltage across which is to be regulated; means connecting a second terminal of said direct current source to a second terminal of said load; biasing means connected between the first of said pair of output electrodes and said control electrodes on each of said semiconductor means for normally maintaining said semiconductor means in a high impedance state in the absence of signals overcoming said bias; a first source of alternating signals; a second source of alternating signals of a different frequency than said first source, transformer means connecting said first source to said second source for algebraically summing said signals; means for applying said summed signals to said control electrodes to overcome said normal bias applied to said control electrodes on said semiconductor means periodically and sequentially in turn, thereby permitting current to flow from said first source terminal to said first load terminal through alternative paths; means for developing error signals proportional to the variation of the load voltage from a predetermined reference; feedback means including further semiconductor means; means for applying said error signals to a control electrode of said further semiconductor means to control the conductivity thereof for controlling the drive current available to the conductive one of said semiconductor means.

No references cited.

Notice of Adverse Decision in Interference

In Interference No. 92,647 involving Patent No. 2,992,385, J. T. Lingle, Semiconductor devices, final decision adverse to the patentee was rendered Aug. 22, 1963, as to claims 1 and 2.

[*Official Gazette November 12, 1963.*]